United States Patent [19]

Cummings, III et al.

[11] Patent Number: 5,178,584
[45] Date of Patent: Jan. 12, 1993

[54] DRIVELINE YOKE WITH HEADED PIN FOR CAPTIVATING A UNIVERSAL JOINT CROSS

[75] Inventors: Gordon F. Cummings, III, Rockford; Larry G. Miller, German Valley; Brian W. Shirley, Rockford, all of Ill.

[73] Assignee: Rockford Powertrain, Inc., Rockford, Ill.

[21] Appl. No.: 759,669

[22] Filed: Sep. 13, 1991

[51] Int. Cl.⁵ ................................ F16D 3/26
[52] U.S. Cl. .................... 464/135; 464/130; 403/57
[58] Field of Search .............. 464/130, 134, 135, 136, 464/182; 403/57

[56] References Cited

U.S. PATENT DOCUMENTS

| | | | |
|---|---|---|---|
| 2,142,432 | 1/1939 | Wollner | 29/152 |
| 2,253,300 | 8/1941 | Karlberg | 464/130 |
| 2,273,920 | 2/1942 | Anderson | 464/130 |
| 2,299,001 | 10/1942 | Anderson | 464/130 |
| 4,453,395 | 6/1984 | Takeda et al. | 72/370 |
| 4,575,361 | 3/1986 | Thatcher | 464/135 |
| 4,995,849 | 2/1991 | Castellon | 464/134 |

Primary Examiner—Daniel P. Stodola
Assistant Examiner—William G. Battista, Jr.
Attorney, Agent, or Firm—Leydig, Voit & Mayer

[57] ABSTRACT

The yoke of a driveline is formed with diametrically spaced and generally semi-cylindrical pockets for receiving the bearing caps of the cross of a universal joint. A notch is formed in each pocket and receives the shank of a pin whose head projects into overlying relation with the pocket and into engagement with the bearing cap to captivate the bearing cap axially in the pocket. The inner end portion of the yoke is formed on a spherical radius and is adapted to pilot into drive tubes of varying internal diameters.

6 Claims, 2 Drawing Sheets

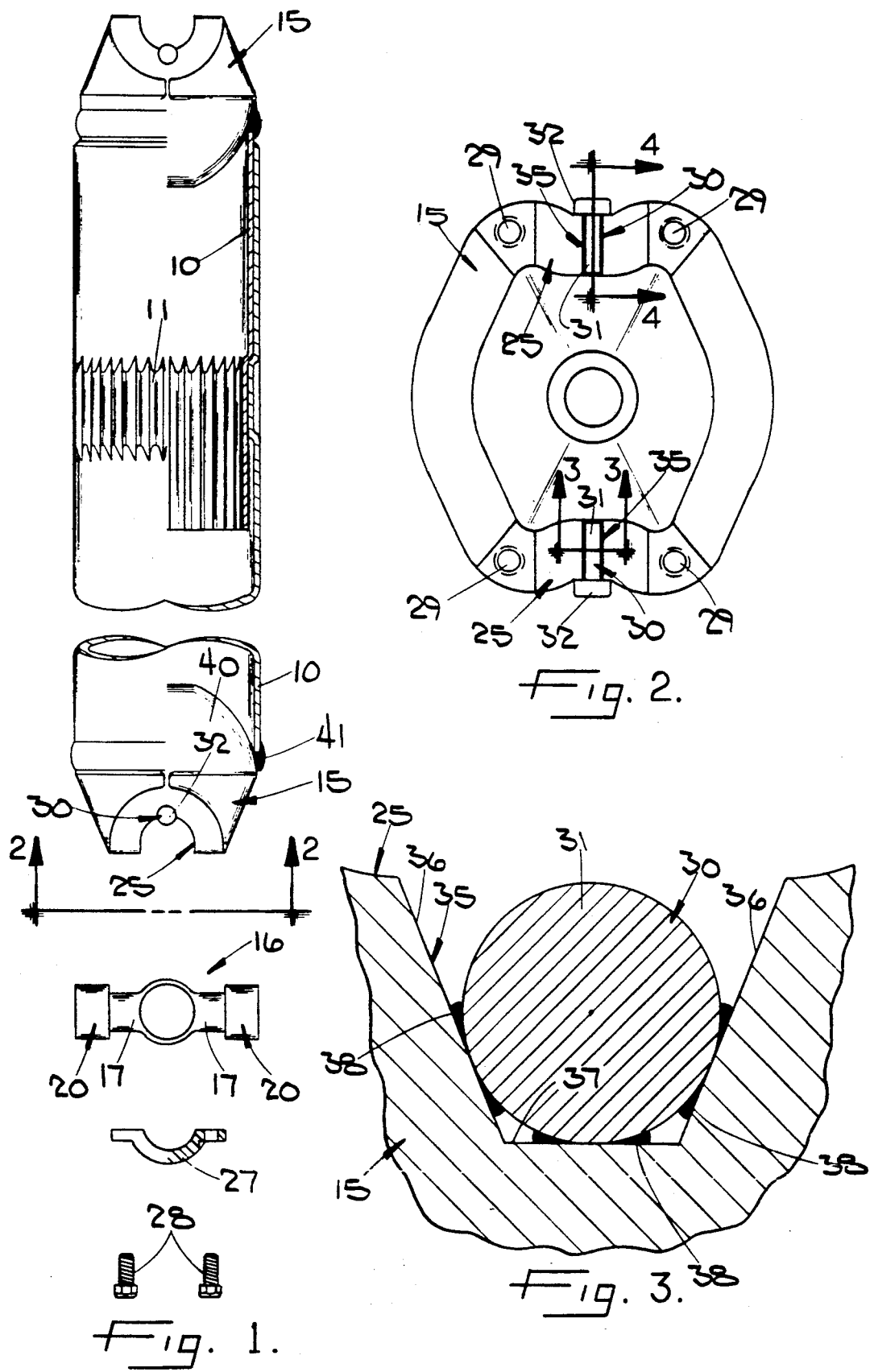

DRIVELINE YOKE WITH HEADED PIN FOR CAPTIVATING A UNIVERSAL JOINT CROSS

BACKGROUND OF THE INVENTION

This invention relates generally to a driveline and, more particularly, to a driveline of the type in which a yoke is secured to the end of a rotatable member such as a shaft or tube and serves as a mounting for a universal joint cross which rotatably connects the member to another rotatable member while enabling relative angular movement between the two members.

Typically, a universal joint cross includes four equally spaced trunnions which rotatably journal cup-shaped bearing caps. Two diametrically opposite bearing caps are received within holes or pockets formed in one end of one yoke of the driveline while the other two bearing caps are received within holes or pockets formed in one end of a second yoke.

The bearing caps are retained radially with respect to the pockets of each yoke and also must be axially retained. One form of axial retention which has been used in the past is to machine a lug from the yoke, the lug engaging the end of the bearing cap to captivate the cap against movement axially of the pocket. Machining of the lug is expensive and requires extra thickness in the yoke to develop the lug. Moreover, the lug protrudes into the pocket and presents an obstruction which must be cleared during machining of the pocket.

SUMMARY OF THE INVENTION

The general aim of the present invention is to provide a driveline yoke having new and improved means for axially captivating the bearing caps of a universal joint cross; such means being relatively inexpensive, enabling faster and more expedient machining of the pockets of the yoke, and enabling better control of the position of the cross.

A more detailed object of the invention is to achieve the foregoing through the provision of axial retention means in the form of a pin having a shank adapted to be fixed within a notch in the pocket and having a head adapted to project into overlying relation with the pocket and into engagement with the bearing cap in order to captivate the latter against axial movement in the pocket.

The invention also resides in the formation of one end portion of the yoke on a spherical radius in order to enable the yoke to pilot tightly into cylindrical drive tubes having different inside diameters.

These and other objects and advantages of the invention will become more apparent from the following detailed description when taken in conjunction with the accompanying drawings.

BRIEF DESCRIPTION OF THE DRAWINGS

FIG. 1 is an exploded top plan view of the components of a typical driveline having new and improved yokes incorporating the unique features of the present invention.

FIG. 2 is an enlarged end view of one of the yokes as seen along the line 2—2 of FIG. 1.

FIGS. 3 and 4 are enlarged fragmentary cross-sections taken substantially along the lines 3—3 and 4—4, respectively, of FIG. 2.

DETAILED DESCRIPTION OF THE PREFERRED EMBODIMENT

Figure 4:
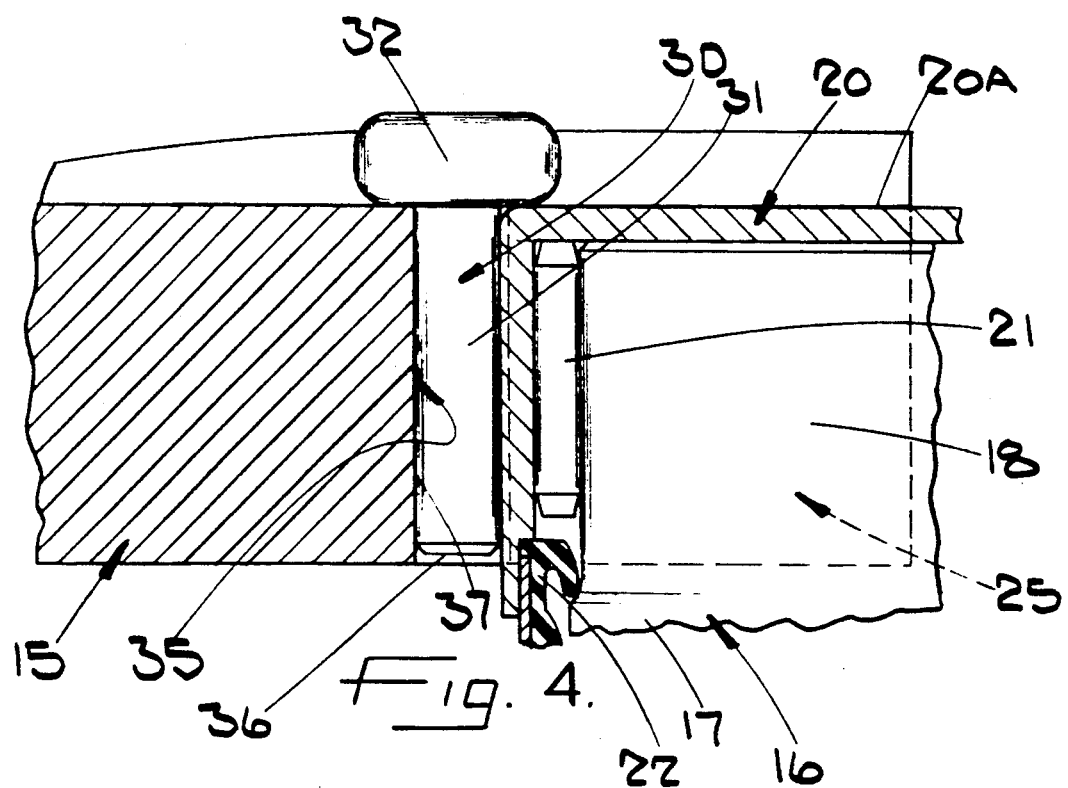

For purposes of illustration, the invention has been shown in the drawings in conjunction with a drive-line of the type used with an off-road vehicle or the like. In the present instance, the driveline includes a telescoped pair of generally cylindrical drive tubes 10 which are splined together as indicated at 11 so as to be capable of sliding relative to one another while transmitting torque. A yoke 15 is carried by the outer end of each tube with each yoke being adapted for connection to the center cross 16 of a universal joint. The cross includes four radially extending and equally spaced arms 17 each having a trunnion 18 (FIG. 4) whose outer end portion rotatably journals a cup-shaped and generally cylindrical bearing cap 20 by means of an annular row of needle bearings 21. A seal 22 confines lubricant within the bearing cap.

The outer end portion of each yoke 15 is formed with two diametrically spaced pockets 25 (FIGS. 1 to 4). Two diametrically spaced bearing caps 20 of the universal joint cross 16 are secured within the pockets 25 of a yoke 15 while the other two bearing caps of the cross are fastened within the pockets of an adjacent yoke (not shown) on another drive tube or shaft. The cross transmits torque through the driveline while permitting universal angular movement between the components of the driveline.

In the present instance, each yoke 15 is stamped and drawn from sheet metal although the yokes could be cast or forged. The two pockets 25 of each yoke are generally semi-cylindrical in shape, are formed on substantially the same radius as the cylindrical bearing caps 20 and are located with their axes aligned with one another and extending perpendicular to the rotational axis of the tubes 10. Each pocket 25 receives a bearing cap 20 and, after the caps have been placed in the pockets, they are clamped radially by straps 27 (FIG. 1) adapted to be secured to the yoke by screws 28 threaded into holes 29 (FIG. 2) in the outer end of the yoke.

While each bearing cap 20 is confined radially in its respective pocket 25 by the strap 27, each cap also must be captivated axially in its pocket. In accordance with the present invention, each bearing cap is retained axially in its pocket by a simple and inexpensive pin 30 which simplifies machining of the yoke 15 and enables good control over the radial position of the cross 16.

More specifically, each of the retention pins 30 includes an elongated shank 31 (FIG. 4) and further includes an enlarged head 32 formed integrally with and extending perpendicular to the shank. In carrying out the invention, the shank 31 of each pin 30 is received and seated within a notch 35 (FIGS. 3 and 4) formed in the yoke 15 and opening into one side of the respective pocket 25. Each notch preferably is formed in the radially deepest portion of the pocket and preferably is of a truncated V-shape. Thus, each notch includes two side surfaces or walls 36 (FIG. 3) which converge toward one another upon proceeding away from the pocket and further includes an end surface or wall 37 extending between the side walls and disposed in a plane extending perpendicular to the rotational axis of the tubes 10.

As shown most clearly in FIGS. 3 and 4, the shank 31 of each pin 30 is seated within the notch 35 against the walls 36 and 37 thereof and is of such diameter as to be located out of the pocket 25. That is to say, the shank does not project radially inwardly into the pocket and interfere with positioning of the bearing cap 20. The shank is secured in the notch by welds such as resistance welds 38 (FIG. 3) located between the shank and the walls 36 and 37 of the notch. The walls locate the shank such that its axis extends perpendicular to the rotational axis of the tubes 10.

While the shank 31 of each pin 30 is located outside of its respective pocket 25, a portion of the head 32 is located so as to project into overlying relation with the pocket as shown in FIG. 4. Thus, a portion of the head engages a portion of the axially facing end wall 20A of the bearing cap 20 and captivates the cap against moving axially outwardly on the trunnion 18.

With the foregoing arrangement, it is a relatively simple matter to form the grooves 35 in each pocket 25 and to machine the pocket. Since the groove is recessed with respect to the pocket, it does not interfere with machining of the pocket.

Resistance welding of each pin 30 in its groove 35 also can be achieved in a relatively simple manner. During welding, the heads 32 of the pins may be spaced apart by a precisely predetermined distance so as to enable accurate control of the radial position of the cross 16 relative to the yoke 15. Once the pins have been welded in the grooves, the end caps 20 may be slipped radially into the pockets 25, captivated axially by the heads 32 and then clamped radially by the straps 27.

Figure 5:
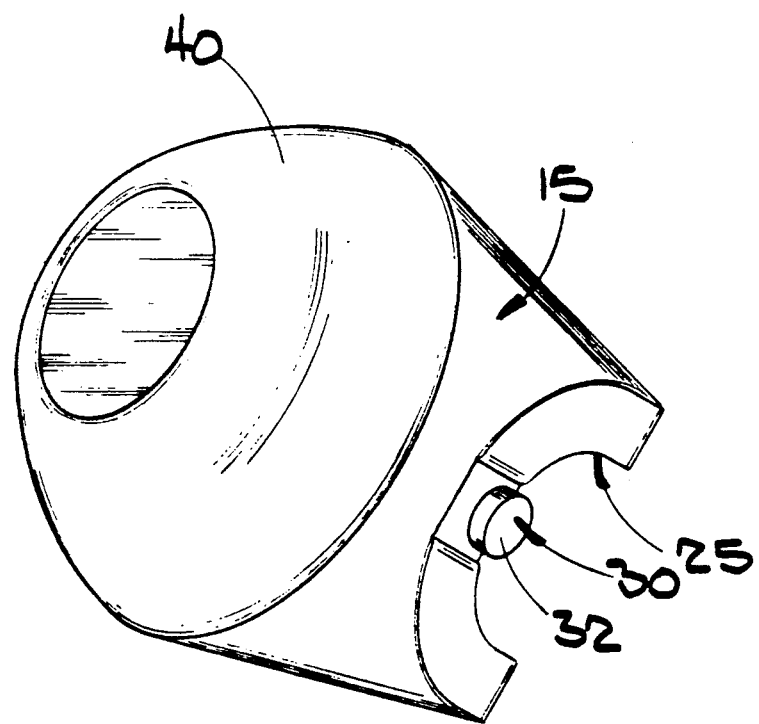
FIG. 5 is a perspective view of one of the yokes.

According to another feature of the invention, the inner end portion of each yoke 15 is formed on a spherical radius so that the outer side of the inner end portion defines a convex spherical surface 40 (FIGS. 1 and 5). The radius on which the surface 40 is formed is somewhat larger than the largest internal diameter of a tube 10 for supporting the yoke. Thus, the yoke may be piloted into the end portion of the tube and will wedge against the end of the tube along an annular band extending around the surface 40. A weld 41 (FIG. 1) then may be employed to secure the yoke to the tube. Because of the spherical surface 40, the yoke may be used universally and effectively with tubes whose internal diameters may be slightly different due to tolerance variations.

We claim:

1. A driveline yoke having inner and outer end portions, the outer end portion of said yoke having a pocket for receiving the bearing cap of a universal joint cross, and means attached to said yoke for retaining said cap in a direction axially of said cap, said means comprising a pin having an elongated shank and having an enlarged head on one end of the shank, a notch formed in said yoke and opening into one side of said pocket, said notch receiving said shank and having surfaces positioned so as to locate said shank out of said pocket into overlying relation with said pocket to engage the bearing cap, and weld means between said shank and said surfaces of said notch to attach said shank to said yoke.

2. A driveline yoke as defined in claim 1 in which said notch is generally V-shaped and includes two side surfaces which converge toward one another upon progressing from the outer end portion of said yoke toward the inner end portion thereof, said shank seating against said side surfaces, said weld means including a weld between said shank and each of said side surfaces.

3. A driveline yoke as defined in claim 2 in which said notch is of truncated V-shape and includes an end surface extending between said side surfaces, said weld means including an additional weld between said shank and said end surface.

4. A universal joint having a driveline yoke rotatable about a predetermined axis and formed with at least one pocket having an axis extending substantially perpendicular to the rotational axis of the yoke, a universal joint cross having at least one trunnion and having a bearing cap rotatably journaled on said trunnion and seated in said pocket, said bearing cap having an axis extending in the same direction as the axis of said pocket, said bearing cap having an end facing axially of the bearing cap, means attached to said yoke for retaining said bearing cap in said pocket in a direction radially of said bearing cap, and means attached to said yoke for retaining said bearing cap in said pocket in a direction axially of said bearing cap, said universal joint being characterized in that said axial retaining means comprise a pin having an elongated shank and having an enlarged head integral with and extending substantially perpendicular to one end of said shank, a notch formed in said yoke and opening into one side of said pocket at the deepest portion of said pocket, said notch receiving said shank and having surfaces positioned so as to locate said pin such that said shank is positioned out of said pocket and substantially parallel tot he axis thereof while a portion of said head projects toward said pocket and engages said axially facing end of said bearing cap, and weld means between said shank and said surfaces of said notch to attach said shank to said yoke.

5. The structure of claim 4 in combination with a tube having a generally cylindrical end portion of predetermined radius for supporting said yoke, said yoke having an end portion received in said end portion of said tube, the end portion of said yoke being curved on a spherical radius of a dimension greater than the radius of the end portion of the tube whereby an annular area of the end portion of the yoke wedges into the end portion of the tube, and weld means securing the end portion of the yoke to the end portion of the tube.

6. A driveline comprising a tube having a generally cylindrical end portion of predetermined radius, a yoke having an end portion received in the end portion of the tube, the end portion of the yoke being curved on a spherical radius of the end portion of the tube whereby an annular area of the end portion of the yoke wedges into the end portion of the tube, and weld means securing the end portion of the yoke to the end portion of the tube.

* * * * *